United States Patent [19]
von Waclawiczek et al.

[11] 4,302,292
[45] Nov. 24, 1981

[54] APPARATUS FOR THE CATALYTIC CRACKING OF GASES

[75] Inventors: Herbert von Waclawiczek, Bergisch Gladbach; Walter Jäger, Engelskirchen, both of Fed. Rep. of Germany

[73] Assignee: GHT, Gesellschaft für Hochtemperatur-Technik mbH, Bergisch Gladbach, Fed. Rep. of Germany

[21] Appl. No.: 82,597

[22] Filed: Oct. 5, 1979

Related U.S. Application Data

[62] Division of Ser. No. 14,358, Feb. 23, 1979, abandoned.

[30] Foreign Application Priority Data

Mar. 3, 1978 [DE] Fed. Rep. of Germany ....... 2809126

[51] Int. Cl.³ ............................................ E21B 12/02
[52] U.S. Cl. ......................................... 376/325; 48/94; 48/103; 48/196 A; 422/191; 422/199; 422/200; 422/222
[58] Field of Search ............ 48/196 A, 197 R, 214 A, 48/94, 103; 423/659, DIG. 6, DIG. 13; 176/39; 219/279; 202/373; 422/191, 199, 200, 222

[56] References Cited
U.S. PATENT DOCUMENTS

| | | | |
|---|---|---|---|
| 1,790,853 | 2/1931 | Casale | 422/199 |
| 2,306,011 | 12/1942 | Burk | 422/191 |
| 2,438,467 | 3/1948 | Tyson et al. | 422/191 |
| 2,459,907 | 1/1949 | Winslow et al. | 422/222 |
| 2,718,460 | 9/1955 | Bowen | 422/222 |
| 3,469,947 | 9/1969 | Drury | 422/199 |
| 3,798,005 | 3/1974 | Koch | 422/222 |
| 4,037,785 | 7/1977 | Modern | 219/279 |

FOREIGN PATENT DOCUMENTS

| | | |
|---|---|---|
| 2412840 | 9/1975 | Fed. Rep. of Germany . |
| 2412841 | 9/1975 | Fed. Rep. of Germany . |
| 2616085 | 10/1976 | Fed. Rep. of Germany . |
| 2553506 | 6/1977 | Fed. Rep. of Germany . |

OTHER PUBLICATIONS

"Transport of Nuclear Heat by Means of Chemical Energy", Kugeler et al., Nuc. Engr. & Design, 1975, No. 34, pp. 65–72.

*Primary Examiner*—Peter F. Kratz
*Attorney, Agent, or Firm*—Herbert L. Lerner

[57] ABSTRACT

Apparatus for high temperature catalytic conversion of gases is disclosed in which the first part of the heating is done with a heating gas and the final most difficult part is done with electric heaters. The heating gas is passed between spaced layers of catalyst, out of contact and crosswise and countercurrent to the flow of gases to be converted. The gases are first subjected to preheating with heating gas, then heating as the gases contact catalyst, and then superheating, i.e. heating to a final high temperature, with electric heaters in the absence of heating gas.

3 Claims, 6 Drawing Figures

APPARATUS FOR THE CATALYTIC CRACKING OF GASES

This is a division of application Ser. No. 014,358, filed Feb. 23, 1979 now abandoned.

BACKGROUND OF THE INVENTION

Field of the Invention

The present invention relates to an installation for the catalytic conversion or cracking of gases such as, for instance, mixtures of methane and steam at high temperatures by means of a cracking furnace.

BACKGROUND OF THE INVENTION

An installation for this purpose is particularly well suited for coal gasification by means of nuclear energy on a large scale. Such plants are known, for instance from German Published Non-Prosecuted Application No. 25 53 506. There, a gas, preferably helium, is heated in a nuclear reactor of the pebble bed type and gives up its heat (for safety reasons via an intermediate heat exchanger) at a starting temperature of about 950° C. to a steam gasifier on the one hand, and on the other hand, to a cracking furnace. In the publication mentioned, reference is also made to the problem that the processes of water vapor gasification and methane cracking proceed with satisfactory yield only in the temperature range above 850° C. and that the heat must therefore be utilized in the lower temperature range for generating steam. However, only a small part of the so generated steam can be used in the plant itself. The rest of the steam is used to generate electric power which, however, can be sold only under unfavorable conditions. In cracking furnaces it is particularly important that the catalytic material can be replaced quickly and reliably and also the heating system can be checked quickly and, if necessary, replaced or repaired in order to reduce the shutdown time of the plant. If these plants are to be heated with helium, it must be remembered that helium does not give off radiation heat and that the heat must be transferred essentially by convection.

In German Published Non-Prosecuted Application No. 26 16 085, cracking furnaces for large-scale coal gasification plants are described, in which the heating gas and the gas to be converted or cracking gas are to have pressures of about 40 bar and in which the heat is largely transmitted by convection. The catalytic material is contained in long, parallel, vertical tubes which have a considerably narrowed-down cross section above and below the catalytic material. Nothing is said about the form and arrangement of the catalytic material, especially about its replacement in these tubes which are narrowed-down on both sides.

In German Published Non-Prosecuted Applications Nos. 24 12 850 and 24 12 841, cracking tubes for the catalytic cracking of hydrocarbons are described. These suspended tubes, which are closed at the lower end, carry inside a helically wound tube leading to the lowest point as the discharge for the cracked gas and are filled with a loose charge of nickel-containing catalytic material. This catalytic material, piled loosely, has a pressure loss which cannot be calculated exactly, but which pressure loss changes with time and, if numerous cracking tubes are connected in parallel, leads to different throughputs of the process gas and thus to different temperatures. If the temperature is lowered, the catalytic material is densified. If the temperature is increased, it expands again and thereby stresses the outer cracking tube and the inner discharge tube. When this catalytic material is exhausted or destroyed, it must be removed laboriously, for instance, pneumatically, from the cracking tubes. Since the provided, helium-cooled nuclear power plants are advantageously operated at a high pressure of, for instance, 40 bar, the cracking tubes must have considerable wall thicknesses which make the heat transfer to the catalytic material worse. In view of a reliable and tight attachment to a tube sheet these cracking tubes must be maintained a certain minimum distance from each other. Therefore, they require considerable space, as compared to the inventory of catalytic material provided. The gas velocity outside the cracking tubes necessary for a highly convective heat transfer is barely reached in this type of design. Also the tube sheet, with the high temperatures and the large diameter, is an expensive metallic part which must be cooled for reasons of mechanical strength and therefore causes considerable thermodynamic losses.

SUMMARY OF THE INVENTION

It is an object of the present invention to provide an installation for the catalytic conversion of gases, in which the heat supplied from an external source is optimally used for carrying out the conversion process and only small amounts of such energy not used in the conversion process are released to the outside. Another object is to provide a furnace which is particularly well suited for use in such an installation, requiring little material and space, and in which the catalytic material can be replaced quickly and simply. A further object of the invention is to provide a furnace in which the gas to be catalytically converted reaches a temperature so high that more or almost complete conversion of the gas takes place. Through this measure the gas need be fed "once through" the furnace and avoids separating a partial stream of unconverted gas from the converted product and recycling the separated unconverted gas to the furnace. This, too, reduces the material and space required and simplifies the operation.

With the foregoing and other objects in view, there is provided in accordance with the invention a method of catalytically converting gases in a furnace at a high temperature in excess of 800° C., by heating the gases with a fluid heating medium and passing the gases in direct contact with a catalyst, heating the gases with the fluid heating medium to a temperature of at least 75% of said high temperature but below said high temperature, and then heating the gases to said high temperature with electrical energy.

More specifically, in accordance with the invention, the gases to be converted pass through a plurality of adjacent catalyst beds with spaces between adjacent beds for flow of heating gas out of direct contact with gases to be converted, and the heating gas passes crosswise through the adjacent spaces and countercurrent to the flow of gases to be converted, and (a) the gases to be converted entering the furnace are passed in a first furnace zone in indirect heat exchange with the heating gas leaving the furnace, (b) the gases to be converted then pass in a second furnace zone containing catalyst in indirect heat exchange with the heating gas passing through the furnace, and (c) the gases to be converted then pass in a third furnace zone containing catalyst and electrical heaters for heating the gases in the absence of the heating gas.

In accordance with the invention there is provided a furnace for catalytically converting gases at a high temperature which comprises a plurality of adjacent catalyst beds with openings through which said gases to be converted flow, spaces between adjacent beds of catalyst with passageways for the flow of a heating gas crosswise to the flow of said gases to be converted and out of direct contact with said gases, crossover connecting means for directing the flow of heating gas from a passageway to another passageway, a first inlet for the flow of gases to be converted through the catalyst beds, a second inlet downstream the flow of gases from the first inlet for the introduction of heating gas to said passageways and crossovers for the flow of heating gas crosswise and countercurrent to said flow of gases, a preheater section of said furnace for indirect heating of said gases by said heating gas disposed immediately downstream the flow of gases from the first inlet, a first outlet for the heating gas from the preheater section, a superheater section of said furnace for heating said gases to a high temperature disposed downstream the flow of gases from the second inlet, containing electric heaters in the spaces between the beds, and a second outlet for the discharge of converted gas from the superheater section of the furnace.

Other features which are considered as characteristic for the invention are set forth in the appended claims.

Although the invention is illustrated and described herein as embodied in an installation for the catalytic cracking of gases, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 5 shows, in a view again enlarged over FIGS. 3 and 4, a horizontal cross section through two frames with catalytic material and with two heating tubes arranged in between.

DETAILED DESCRIPTION OF THE INVENTION

Figure 1:
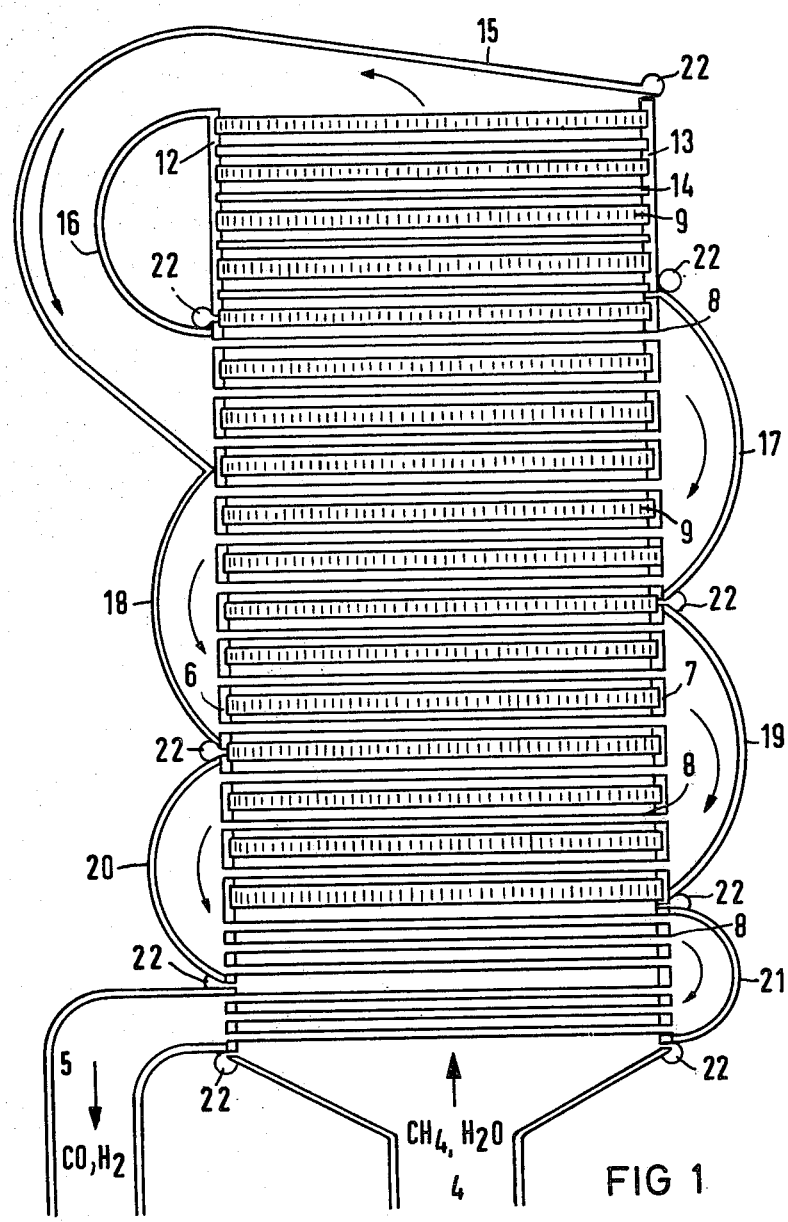
FIG. 1 shows a horizontal cross section through an electrically heated cracking furnace with regenerative preheating of the entering gas to be cracked by the leaving cracked gas.

Through use of the electric heating system in the combination furnace in accordance with the invention the conversion or cracking gas can always be kept at a temperature at which the conversion or cracking process proceeds rapidly to a point of almost complete conversion. The basically high cost of an electric heating system is more than made up by the thus obtained savings in the size of the plant and the residence time of the gas therein undergoing conversion. The electric heating system must bridge only a relatively small temperature span which is between the temperature attainable by means of the heating gas (the helium heated up in the nuclear reactor) and the optimum temperature for the desired reaction. This temperature span is less than 25% of the optimum temperature for the desired reaction. This arrangement is especially advantageous if the cracking furnace is to be heated with nuclear heat from a gas-cooled high-temperature reactor. The helium leaving a nuclear reactor with a temperature of about 950° C. gives off its heat only with a temperature gradient to a secondary loop likewise containing helium, or to the cracking gas, i.e. gas to be cracked. This secondary loop or the cracking gas naturally has only a maximum temperature of about 850° C. High temperatures can be considered as above 800° C., generally above 850° C. Since, however, the important cracking processes occur substantially completely only at about 1000° C. or higher, it is advantageous to supplement the missing upper temperature range by electric heating.

The heating gas is partially cooled down in the cracking furnace. The retained considerable heat content of the heating gas is utilized beneficially for generating that electric energy which is required for heating the cracking gas, and which consequently need not be given to an outside user under unfavorable conditions.

The arrangement of catalytic material in the furnace of the invention permits one to attain an optimum temperature of the cracked gas, largely independently of what can be obtained by the heating gas. The material and space requirements are reduced considerably over the thickwalled cracking tubes filled with the catalytic material, the heat transfer is improved and a large portion of the mechanical strength problems is simplified.

Through the alternating and thereby mechanically separated arrangement of the heating provisions and the catalytic material in the furnace of the present invention, both can be laid out optimally with respect to heat transfer and pressure loss. In addition, replacing the catalytic material can be simplified considerably, and in particular, it is no longer necessary to open part of the heating system or even to disassemble it for this purpose. Arranging the catalytic material, for instance, in vertical frames which are held in U-shaped guide rails, offers particular advantages in replacing it by means of a simple hoisting device.

The arrangement of the furnace has considerable design advantages particularly in conjunction with the electric heating system provided. The electric heating rods can be arranged, for instance, as vertically suspended U-shapes in planes between the catalytic material. They can expand freely when hot and can have all of their power connections on only one side of the cracked gas canal, so that they can be installed and supplied with current inexpensively. The indirect heating, which is preferable in the lower temperature range by means of a heating gas, is likewise accomplished better than in the known plants by means of a number of heat exchanger tubes of conventional design. The heating gas flows through the inside of the heat exchanger tube which extend into the space through which the cracking gas flows. With the basically small distance between the heaters and the catalytic material and with the high temperatures provided, large and direct heat transfer by radiation from the heaters to the catalytic material can be expected with this arrangement.

There are considerable advantages in the combination of electric heating with the arrangement of the catalytic material and the heating system according to the invention. As the temperatures in the cracking gas canal increase steadily in the direction of the cracked gas stream, no substantial temperature differences and therefore, also no large thermal stresses are expected between adjacent parts, especially in the side walls of the cracking gas canal. Possible temperature striations in the cracking gas canal are equalized by the multiple deflection in the crosswise counterflow.

Referring to FIG. 1, the feed gas to be converted containing $CH_4$ and $H_2O$ and termed cracking gas, flows from the cracking gas inlet canal 4 at first straight and then in crosswise counterflow back to the cracked-gas outlet canal 5. The straight canal through which the feed gas $CH_4$ and $H_2O$ entering through inlet canal 4 flows, is bounded on two opposite sides by the tube sheets 6 and 7. The tube sheets 6 and 7 are connected by numerous parallel heating tubes 8 which are arranged in planes and between which the respective catalytic material 9 with numerous small canals 10 (FIG. 4) oriented in the flow direction is arranged. In the region of the low gas temperatures, i.e., in the vicinity of the gas inlet canal 4, these tube sheets bound only heating tubes 8 and no catalyst, while in the region of medium or intermediate gas temperatures, they bound alternatingly heating tubes 8 and catalytic material 9. In the region of the high gas temperatures, i.e. in the vicinity of which electric heating rods 14 are disposed instead of the heating tubes 8, closed walls 12 and 13 are arranged instead of the tube sheets 6 and 7. After being subjected to this electrical heating, the cracked or converted gas is conducted through a passageway formed by the deflection walls 15 and 16 to the nearest heating tubes 8 and then flows in crosswise and countercurrent to the feed gas, being conducted from heating tubes 8 to succeeding heating tubes 8 by the guiding walls 17, 18, 19, 20 and 21 and finally discharging as converted gas through outlet canal 5. Between the deflection and guide walls and the adjacent tube sheets 6 and 7 as well as also between the feed gas inlet and outlet canals 4 and 5 and the tube sheets, are welded on elastic but tight expansion compensators 22. In this manner, a compact block is provided which contains alternatingly catalytic material and electric or gas heaters and is not imperiled by thermal stresses between adjacent parts.

Figure 2:
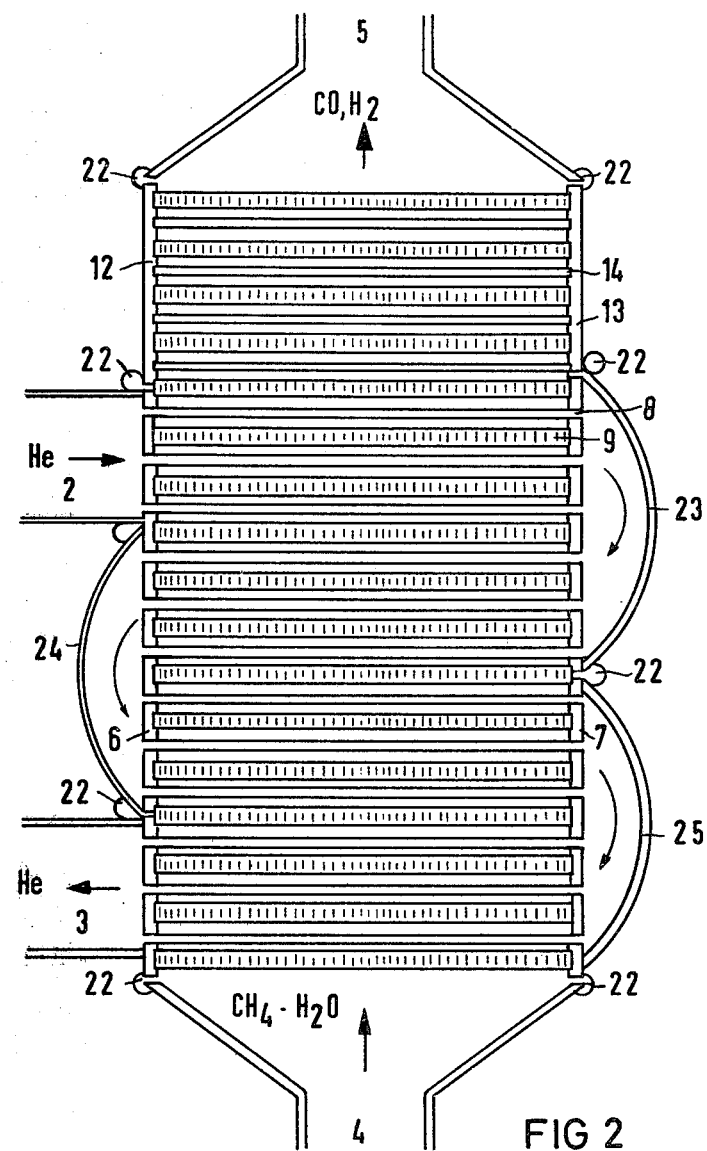
FIG. 2 shows a horizontal cross section through a cracking furnace which is partly heated with helium in crosswise counterflow and partly electrically.

In FIG. 2, the cracking gas flows approximately in a straight line from the cracking-gas inlet canal 4 to the cracked-gas outlet canal 5 and is bounded there, similar to FIG. 1, first by the tube sheets 6 and 7 and then, by the closed walls 12 and 13. The gaseous heating medium, for instance, helium, flows from the heating gas inlet canal 2 in crosswise counterflow to the flow of feed gas entering inlet canal 4. The heating gas is conducted in its passage from heating tubes 8 to succeeding heating tubes 8 by the guide walls 23, 24 and 25 and finally discharges from the heating gas outlet canal 3.

Corresponding to FIG. 1, expansion compensators 22 are arranged here, too, between adjacent parts of different temperature. In the region of the high gas temperatures, the cracking gas is heated not with helium but only by the electric heating rods 14. It is, of course, also possible in the design shown in FIG. 2 to provide in the region of the low gas temperatures only tube registers for the heat exchange between the outflowing helium and the entering cracking gas without having to dispose catalytic material there.

Figures 3, 4:
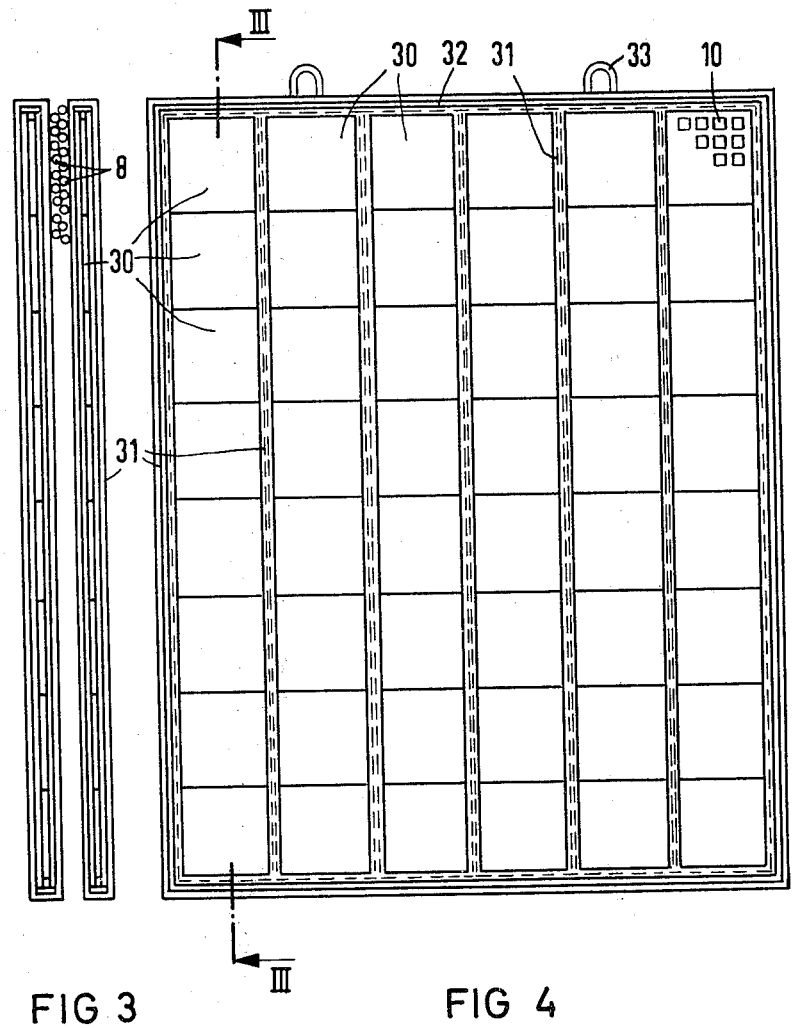
FIG. 3 shows in an enlarged view a vertical cross section through two frames with catalyzer plates shown in FIG. 4, between which a heating register is arranged. In the case of electric heating, these heating tubes are replaced by a register of, for instance, U-shaped heating rods.
FIG. 4 shows a vertical cross section through FIG. 1, namely, a view onto a frame filled with square catalyst elements.

Referring to FIGS. 3 and 4, the square slabs of catlyst 30 are stacked on top of each other in several parallel vertical rows and held together by H-sections 31 arranged in between as well as by an outer frame 32. Two U-shaped loops 33 can be fastened to lift the entire frame 32.

Figure 5:
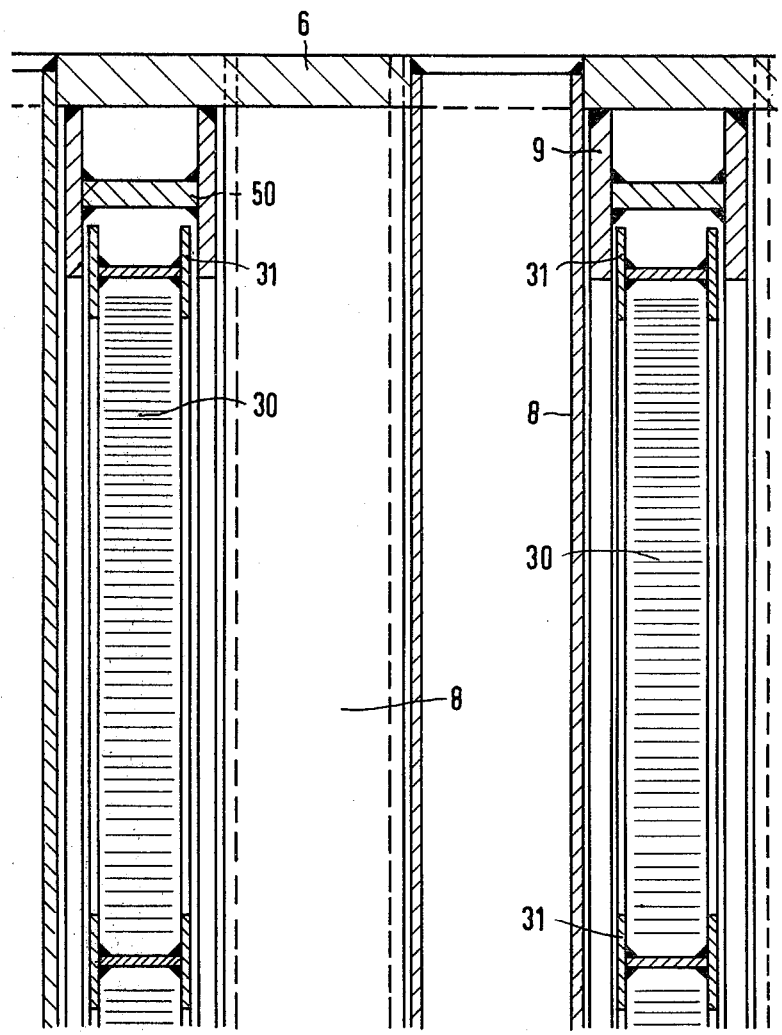

In FIG. 5, the square catalyst slabs 30 are held together as in FIG. 3 by H-sections 31 which are again guided on the outside by larger H-sections 50 which are fastened to the tube sheets 6 shown in FIG. 1. In this case, two planes of heating tubes are shown between the two frames filled with catalyst slabs shown, the one tube being shown in cross section and the other in a view, offset behind.

Figure 6:
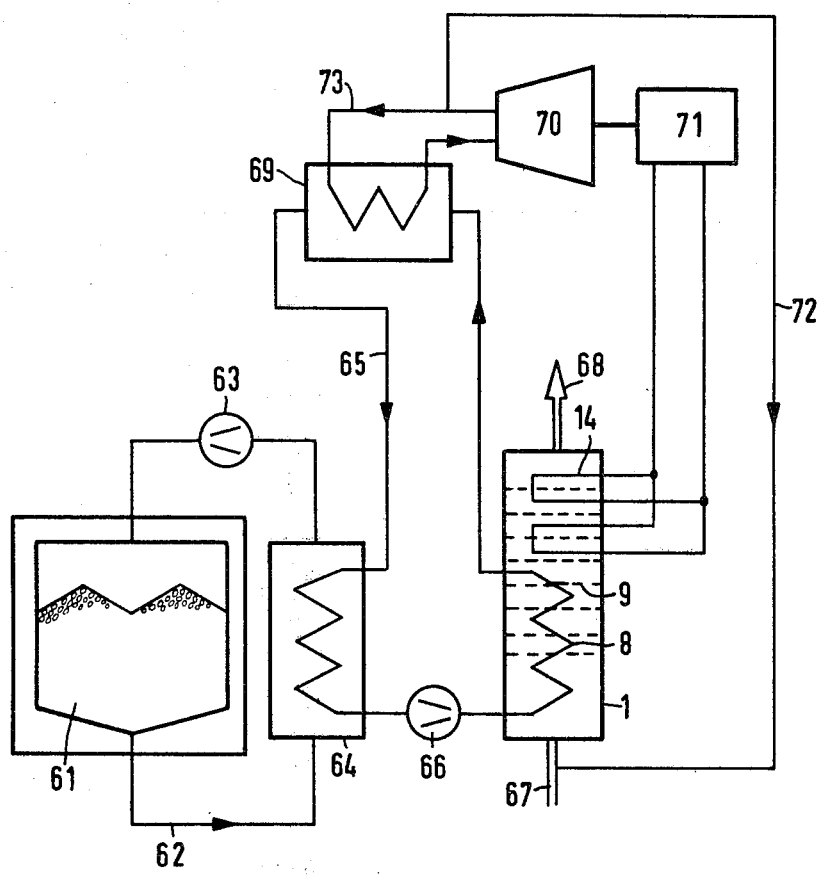
FIG. 6 diagrammatically illustrates the entire plant.

FIG. 6 diagrammatically shows a high-temperature nuclear reactor 61 of the pebble bed type, in which the coolant, helium, which is circulated in a primary loop 62 by means of a pump 63, is heated to about 950° C. The coolant gives off its heat in an intermediate heat exchanger 64 to a secondary loop 65 which is likewise operated with helium and reaches a temperature of about 850° C. This heating gas is fed by means of a further pump 66 to the cracking furnace 1, where it heats the cracking gas (methane and steam) fed to it via a feed line 67 by heat from the heating tubes 8. The cracking gas is brought to a temperature of above 1000° C. and thus into a range sufficient for substantially complete cracking by electric heating rods 14. The cracked gas, split into hydrogen and carbon monoxide by means of the catalyzer 9 placed crosswise to the stream of cracking gas, leaves the cracking furnace 1 via a discharge line 68. The heating gas from furnace 1 at a temperature of about 500° C. is fed to a steam generatore 69 where it cools down to about 250° C. and the cooled gas then flows into the intermediate heat exchanger 64. The steam generated in the the steam generator 69 drives a turbine 70 and the latter drives an electric generator 71 which supplies the heating rods 14 with electric power. Part of the steam is fed to the cracking gas inlet line 67 via a by-pass line 72. The water-steam loop 73 must therefore be replenished continuously. Showing of possible regenerative heat exchangers, known per se, in which, for instance, the heat contained in the cracked gas is used for preheating the heating gas, was dispensed with here in the interest of greater clarity of presentation.

There are claimed:

1. Apparatus for catalytically converting gases at a high temperature which comprises,
   (a) a gas-cooled, high temperature nuclear reactor delivering gas heated to a temperature above 800° C.,
   (b) a cracking furnace provided with inlets and outlets for cracking gas passed through openings in a plurality of superposed catalyst beds spaced from one another, the spaces inbetween a last section of catalyst beds before discharge of the cracking gas from the catalyst beds being occupied by electric resistance heaters designed to raise the temperature of the cracking gas to above 1000° C., and the spaces in a next section of catalyst beds adjacent to and upstream from said last section having connecting means for flowing said heating gas crosswise to the flow of said cracking gas and out of direct contact with said cracking gas, and crossover connecting means for directing the flow of heating gas from a connecting means in a space to another connecting means, (c) electricity generating means connected to these heaters and powered by a steam turbine, and (d) a steam generator for delivering steam to said turbine and heated by the heating gas leaving the cracking furnace, and conduit means for recirculating the heating gas from the steam generator to the nuclear reactor.

2. Apparatus according to claim 1, wherein the cracking furnace has (a) a preheater section which is adjacent to and upstream from said next section, in which no catalyst beds are arranged, but only connecting means conducting the heating gas.

3. Apparatus according to claim 1, wherein each catalyst bed in the cracking furnace is composed of slabs of catalyst material stacked side-by-side and held in place by a frame.

* * * * *